US008350201B2

(12) United States Patent
Bastian

(10) Patent No.: US 8,350,201 B2
(45) Date of Patent: Jan. 8, 2013

(54) SYSTEMS, APPARATUS AND METHODS TO COMPENSATE FOR ROLL ORIENTATION VARIATIONS IN MISSILE COMPONENTS

(75) Inventor: Thomas W. Bastian, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 197 days.

(21) Appl. No.: 12/904,881

(22) Filed: Oct. 14, 2010

(65) Prior Publication Data

US 2012/0091254 A1     Apr. 19, 2012

(51) Int. Cl.
 F42B 15/01 (2006.01)
(52) U.S. Cl. ............... 244/3.24; 244/3.21; 244/3.15
(58) Field of Classification Search ......... 244/3.24, 244/3.21, 3.23, 3.28, 3.3, 3.15, 3.16, 3.17
See application file for complete search history.

(56) References Cited

U.S. PATENT DOCUMENTS

| | | | |
|---|---|---|---|
| 2,959,143 A | 11/1960 | Endrezze | |
| 3,047,259 A | 7/1962 | Tatnall et al. | |
| 3,122,884 A | 3/1964 | Grover et al. | |
| 3,457,861 A | 7/1969 | Crockett | |
| 3,721,193 A | 3/1973 | Piester | |
| 3,978,790 A | 9/1976 | Sandelius | |
| 4,281,601 A | 8/1981 | Overman | |
| 4,318,271 A | 3/1982 | Doukakis et al. | |
| 4,607,810 A | 8/1986 | Frazer | |
| 4,726,543 A | 2/1988 | Stessen | |
| 4,752,052 A | 6/1988 | Galvin | |
| 4,830,311 A * | 5/1989 | Pritchard et al. | 244/3.15 |
| 5,103,734 A | 4/1992 | Arnaud et al. | |
| 5,183,962 A | 2/1993 | Karius et al. | |
| 5,259,569 A * | 11/1993 | Waymeyer et al. | 244/3.22 |
| 5,368,255 A | 11/1994 | August | |
| 5,451,014 A * | 9/1995 | Dare et al. | 244/3.15 |
| 5,613,650 A * | 3/1997 | Kaifu et al. | 244/3.16 |
| 5,735,114 A | 4/1998 | Ellingsen | |
| 5,957,147 A | 9/1999 | Hubbell, Jr. | |
| 6,040,523 A | 3/2000 | Cunningham | |
| 6,086,400 A | 7/2000 | Fowler | |
| 6,231,002 B1 * | 5/2001 | Hibma et al. | 244/3.22 |
| 6,271,464 B1 | 8/2001 | Cunningham | |
| 6,880,780 B1 | 4/2005 | Perry et al. | |
| 7,004,425 B2 | 2/2006 | Okada et al. | |
| 2005/0000383 A1 | 1/2005 | Facciano et al. | |
| 2005/0263029 A1 | 12/2005 | Kumar | |
| 2007/0074636 A1 | 4/2007 | Rieger et al. | |

(Continued)

OTHER PUBLICATIONS

Wikipedia, The Free Encyclopedia, "Thrust Vectoring," dated Mar. 4, 2010; retrieved on Mar. 10, 2010 from the Internet at http://en.wikipedia.org/w/index.php?titlte=Thrust_vectoring&oldid=3477....

(Continued)

Primary Examiner — Christopher P Ellis
Assistant Examiner — Medhat Badawi
(74) Attorney, Agent, or Firm — Eric A. Gifford

(57) ABSTRACT

The roll orientation of a thrust vector control (TVC) or other missile section is measured and used to compensate the operation of the control surface. A measurement of a roll orientation of the control surface relative to the missile is obtained from a detector, memory or other source. Compensated control commands are determined at least in part based upon the measurement to account for the roll orientation of the control surface relative to the missile, and the compensated control command is provided to thereby actuate the control surface during operation of the missile.

24 Claims, 3 Drawing Sheets

U.S. PATENT DOCUMENTS

| | | | |
|---|---|---|---|
| 2008/0011180 A1 | 1/2008 | Stimpson | |
| 2008/0111020 A1 | 5/2008 | Peterson | |
| 2008/0179449 A1 | 7/2008 | Hatalsky et al. | |
| 2009/0072076 A1 | 3/2009 | Brinkerhoff et al. | |
| 2012/0018572 A1* | 1/2012 | Shai ............................ | 244/39 |

OTHER PUBLICATIONS

Raytheon "AIM-9X Sidewinder, Fifth Generation High Off-boresight, Thrust-Vectored Air-to-Air Missle," Oct. 2008.

Geswender, Chris E. "Low Cost Deployment system and Method for Airborne Object," U.S. Appl. No. 12/436,567, filed May 6, 2009.

European Patent Office, International Searching Authority, "International Search Report," mailed Jul. 21, 2010; International Application No. PCT/US2010/032594, filed Apr. 27, 2010.

USPTO "Non-Final Office Action" mailed Jun. 9, 2011; U.S. Appl. No. 12/436,567, filed May 6, 2009.

USPTO "Non-Final Office Action" mailed Jun. 9, 2011; U.S. Appl. No. 11/457,993, filed Jul. 17, 2006.

USPTO "Notice of Allowance and Fee(s) Due" mailed Aug. 23, 2011; U.S. Appl. No. 12/436,567, filed May 6, 2009.

* cited by examiner

SYSTEMS, APPARATUS AND METHODS TO COMPENSATE FOR ROLL ORIENTATION VARIATIONS IN MISSILE COMPONENTS

TECHNICAL FIELD

The following discussion generally relates to missiles. More particularly, the following discussion relates to systems and methods for compensating for roll orientation variations that may occur when missile components are assembled.

BACKGROUND

Missiles are constantly evolving to become more effective yet easier to manufacture. In recent years, for example, certain types of missiles have used thrust vectoring to improve missile control and performance. The AIM-9 Sidewinder missiles manufactured by Raytheon, for example, commonly use a thrust vector control (TVC) mechanism that is mounted to the rear of the missile's exit cone to change the direction of thrust and thereby control the attitude or angular velocity of the missile. The TVC typically includes any number of vanes or other control surfaces that can extend into thrust gasses exiting the rocket motor to thereby change the heading of the missile. Thrust vectoring is also used in other types of missiles, as well as in rockets, jet aircraft and the like.

A challenge often arises, however, in properly orienting the TVC or other control surfaces of the missile during assembly. Generally speaking, it has been important that the control surfaces be precisely positioned with respect to the roll axis of the missile to allow for accurate control in the pitch and yaw directions. Typically, the need to precisely orient the control surfaces to the rest of the missile presents a significant challenge in manufacturing and assembly. In the case of the Sidewinder TVC mechanism, for example, the exit cone containing the TVC control surfaces is typically attached to the body of the missile using a non-threaded joint that is relatively bulky, complicated and expensive to implement. Other attempts to use conventional threaded joints to attach the TVC to the missile body have been met with limited success due to the level of precision needed to machine accurate threads. Even in such cases, shimming or other compensation was often needed during assembly of the threaded joint. Similar issues can arise in other settings, particularly where threaded joints are desired. A seeker assembly attached the nose of a glide bomb casing, for example, often uses a threaded or non-threaded joint that can be sensitive to the roll alignment between the seeker and bomb. Alignment uncertainty issues may arise in any number of other components and products as well.

It is therefore desirable to conveniently manufacture, assemble and operate the control surfaces of a missile or other projectile without sacrificing performance. These and other desirable features and characteristics will become apparent from the subsequent detailed description and the appended claims, taken in conjunction with the accompanying drawings and this background section.

BRIEF DESCRIPTION

Various embodiments provide systems, apparatus and/or methods that allow for at least some variation in assembling missile components. After the components are assembled, the roll orientation of a component of interest is measured, and the roll orientation measurement is used to compensate subsequent operation. Rather than requiring adherence to strict tolerances, then, various embodiments compensate for variations between missiles or components to provide reliable operation with less stringent manufacturing and assembly constraints.

In various exemplary embodiments, a method to operate a control surface of a missile may be executed by a digital controller or other control logic associated with the missile. The method suitably comprises obtaining a measurement of a roll orientation of the control surface relative to the missile, generating a compensated control command to actuate the control surface, wherein the compensated control command is determined at least in part based upon the received measurement to account for the roll orientation of the control surface relative to the missile, and providing the compensated control command to thereby actuate the control surface during operation of the missile.

Other exemplary embodiments provide a missile comprising a missile body housing an engine configured to produce thrust gases, an exit cone coupled to the missile body and having a roll orientation relative to the missile body, wherein the exit cone comprises a control surface that is actuatable to extend into the thrust gases and thereby change a heading of the missile, and a controller. The controller is configured to obtain a measurement of the roll orientation of the exit cone, to generate a control command to actuate the control surface that is compensated for the measured roll orientation of the exit cone, and to provide the compensated control command to thereby actuate the control surface and thereby change the heading of the missile.

Still other exemplary embodiments provide a missile comprising a missile body housing an engine configured to produce thrust gases, an exit cone coupled to the missile body by a threaded or similar joint, a detector configured to provide a measurement of a roll orientation of the exit cone relative to the missile body, and a controller. The exit cone has a roll orientation relative to the missile body that is dependent at least in part upon the threaded joint, and wherein the exit cone comprises a thrust control vector mechanism with a plurality of control surfaces that are each actuatable to extend into the thrust gases and thereby change a heading of the missile. The controller is configured to receive the measurement of the roll orientation of the exit cone from the detector, to generate a plurality of control commands to actuate each of the plurality of control surfaces, wherein each of the control commands is compensated at least in part based upon the measurement of the roll orientation of the exit cone, and to provide the compensated control commands to thereby actuate the control surfaces and thereby change the heading of the missile.

The various implementations may be enhanced or modified in many different ways to create any number of alternate embodiments. Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a diagram of an exemplary missile;

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various embodiments are able to avoid the need to precisely control the roll position of an exit cone or other missile component that houses control surfaces by measuring the actual roll orientation of the component after assembly, and then compensating for any variations in roll orientation during operation. Rather than relying upon relatively complicated or difficult-to-machine joint structures to ensure precise mechanical positioning, then, various embodiments accept some missile-to-missile variation in orientation. Variations in orientation are accommodated by adjusting the control signals applied to control surfaces in the component of interest to compensate for the actual roll orientation of the component, which is determined through measurement. The measurement may take place at any point after assembly using any sort of automatic or manual techniques.

Various examples are described in increasing detail below; equivalent embodiments may apply similar concepts or structures in other settings. Although the following discussion frequently references a threaded joint between a thrust vector control mechanism and a missile body, for example, similar concepts may be equivalently applied to joints between a seeker and the nose assembly of a glide bomb, or to any other threaded or non-threaded joints used to join components of a bomb, missile or other projectile where alignment issues could otherwise arise.

Figure 1:
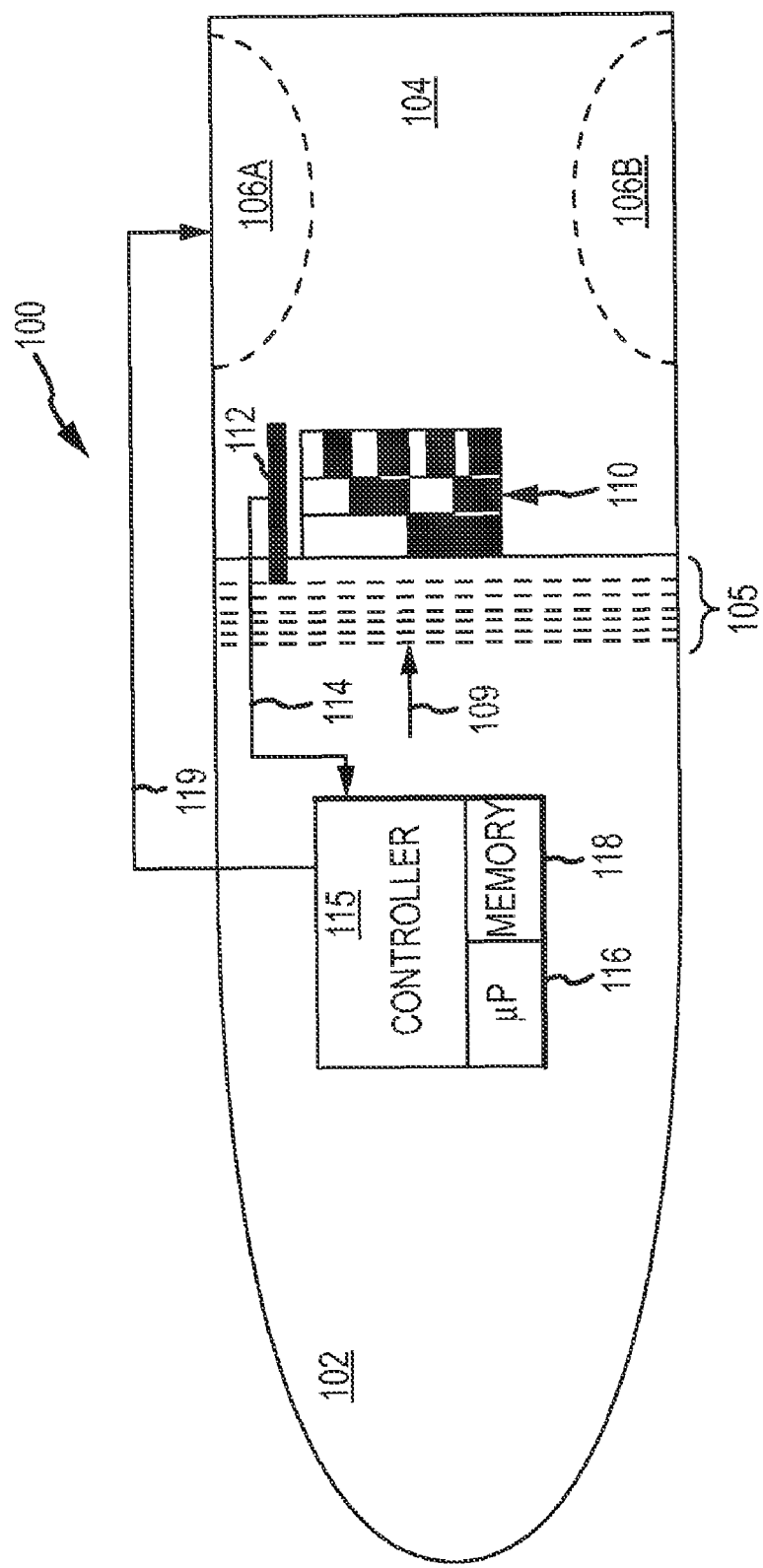

FIG. 1 shows an exemplary missile 100 that includes a missile body 102 with an attached exit cone 104. Exit cone 104 suitably houses a thrust vector control (TVC) mechanism or the like that includes one more control surfaces 106A-B. FIG. 1 shows control surfaces 106A-B extending inwardly from the outer diameter of missile 100 to lie within a stream produced by thrust gases from the missile's engine. By actuating one or more control surfaces 106A-B to deflect the engine exhaust stream, the orientation of missile 100 can be adjusted and controlled using conventional TVC techniques.

Exit cone 104 is shown coupled to the missile body 102 by a joint 105. The joint 105 in this example may be a conventional threaded or similar joint that uses a wedge or similar structure to fasten exit cone 104 to body 102. As noted above, the joint 105 need not be precisely machined and positioned to preserve near-perfect alignment of cone 104 and body 102, as was commonly done previously. To the contrary, some variation in the relative alignment of cone 104 and body 102 may be readily compensated using controller 115, as described more fully herein.

Controller 115 is any digital, analog or other processing logic capable of controlling the operation of control surfaces 106A-B. In various embodiments, controller 115 is a control module found within missile 100 that executes on any sort of microprocessor, microcontroller, digital signal processor, programmed logic device, or other processor 116. Controller 115 may also incorporate software and/or firmware that is stored in a memory 118 and executed on processor 116, as desired. In operation, controller 115 suitably obtains a measurement 114 of the roll orientation of exit cone 104 and uses this measurement to adjust or otherwise compensate control signals 119 that are applied to control surfaces 106A-B as appropriate.

The roll orientation of exit cone 104 may be measured or otherwise obtained in any manner. Various embodiments may provide visual, electrical, magnetic or other features 110 on at least some of the circumference of exit cone 104, for example, so that that the angular position of the exit cone 104 with respect to any reference 109 on the missile body 102 can be determined. These features are typically located at a position that is known with respect to the control surfaces 106A-B, even if the position is not initially known with respect to missile body 102. By measuring the angular position of features 110 with respect to any point or frame of reference 109 on missile body 102, however, the roll orientation of exit cone 104 (and therefore control surfaces 106A-B) can be readily determined. This information may, in turn, be used to adapt or compensate control signals 119 that are provided to the control surfaces 106A-B by controller 115, as desired.

Features 110 may be observed in any manner to create measurement 114. In some implementations, observation and measurement by a human operator may take place just after manufacturing or assembly, just prior to use, after deployment to a customer, or at any other time as desired. The measurement 114 of the roll orientation of exit cone 104 may be recorded or otherwise provided via any interface for storage in memory 118 or elsewhere. For example, personnel responsible for final assembly of missile 100 could use appropriate measuring equipment to determine the actual roll orientation of exit cone 104 and to store this measurement data in a non-volatile or other memory 118. Missile 100 would then retrieve this orientation data from the memory 118 as needed during flight or other subsequent use.

In other embodiments, the roll orientation 114 is automatically measured using any sort of optical, electrical, magnetic, Hall effect or other detector 112. In the example of FIG. 1, an optically-readable pattern 110 is placed on the exterior surface of the exit cone 104. This pattern 110 may be applied using paint, stencils, decals, or any other techniques as desired. In this example, the pattern 110 includes multiple rows and columns that are colored, shaded or otherwise denoted so that detector 112 can ascertain the position of pattern 110 with respect to reference 109 or any other point on missile bode 102. FIG. 1 particularly shows a three "bit" pattern 110 that includes three rows of shaded values. Detector 112 in this example has multiple "detectors" (e.g., one for each channel) or other features that allow for the detection of the pattern that is located at a known position with respect to missile body 102 (e.g., proximate or aligned with detector 112 and/or any other reference, such as reference 109). By detecting which "line" of pattern 110 is aligned with to reference 109, detector 112, and/or any other known point on missile body 102, the relative angular position of exit cone 104 can be determined with respect to missile body 102. This, in turn, indicates the roll orientation of exit cone 104 and the control surfaces 106A-B contained therein.

Figure 2:
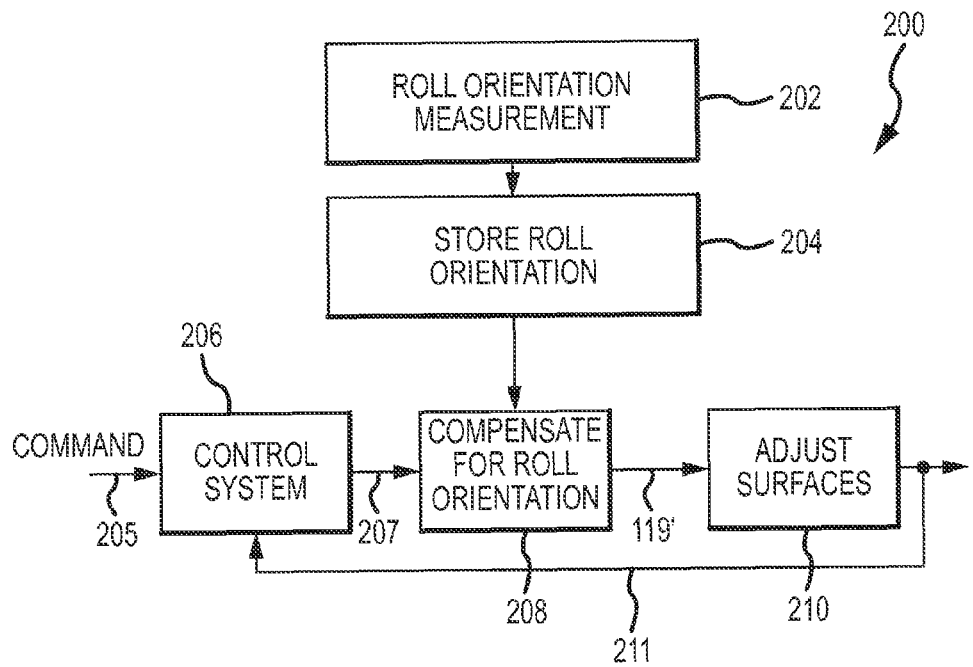
FIG. 2 is a block diagram of an exemplary control system for a missile.

Controller 115 suitably uses the detected angular orientation of exit cone 104 to adjust the control signals 119 provided to control surfaces 106A-B to compensate for any differences in alignment along joint 105. FIG. 2 shows one example of a control technique that can be used to adjust the control signals 119 as needed.

With reference now to FIG. 2, the roll orientation of the exit cone 104 and its control surfaces 106 is obtained in any manner (function 202). As noted above, the orientation may be measured by a human observer at any point in time after assembly. Alternatively, the roll orientation of exit cone 104 may be obtained from detector 112 or the like at any point after assembly, as described above. This orientation measurement may be stored in memory 118 (function 204) or elsewhere, where it is retained for subsequent processing.

In still other embodiments, the roll orientation of control surfaces 106 may be determined during flight of missile 100. The control surfaces 106 may be actuated in a known manner (e.g., for a predetermined displacement and duration), and the missile's response to the applied stimulus can be observed using gyroscopes or other sensors on board missile 100. When the pitch and yaw produced by a known stimulus to control surfaces 106 are quantified and compared, then the orientation of the control surfaces 106 with respect to any frame of reference can be deduced. Hence, it is not necessary to pre-measure the roll orientation in all embodiments. Other embodiments may obtain roll orientation measurements using other sensing techniques other than those set forth herein.

Control function 206 suitably produces appropriate command signals 119 for one or more control surfaces 106 in response to applied commands 205. In prior implementations that relied upon accurate alignment of the exit cone 104 and missile body 102, control signals 207 were frequently produced with regard to the pitch and yaw axes of the missile 100 itself. When the roll orientation measurement indicates that the pitch and yaw axes of the exit cone 104 differ from those of the missile body 102, however, the pitch and yaw commands 207 produced by control function 206 may be compensated (function 208) as needed. By performing coordinate system transformation or the like, however, the pitch and yaw commands 207 may be adapted as needed to compensate for the roll orientation of the exit cone 104. The compensated command signals 119 are appropriately provided to the control surfaces 106 to actuate the surfaces as needed to create a desired heading for the missile 100. Feedback signals 211 may be used to improve performance and stability, as desired.

Figure 3:
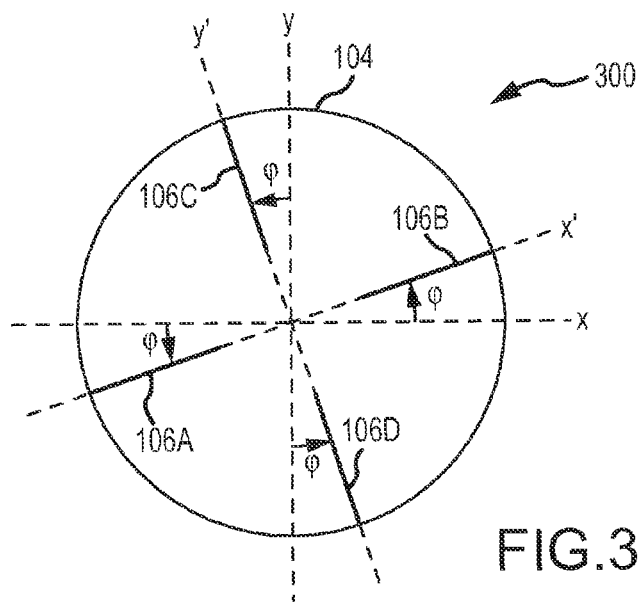
FIG. 3 is a diagram showing an exemplary technique for compensating for the roll orientation of a control surface.

FIG. 3 shows an example of a coordinate system transformation 300 between the yaw (x) and pitch (y) axes of the missile body 102 and the yaw (x') and pitch (y') axes of the control surfaces 106A-D. In this example, the missile body 102 and the control surfaces 106 have a roll orientation difference indicated by angle φ. In the absence of any transformation, uncompensated command signals 207 applied to the control surfaces 106 could produce undesired results. By adapting commands 207 to apply in the measured orientation of control surfaces 106A-D, however, the performance of missile 100 can be maintained at a desired level of accuracy even though the control surfaces 106 and missile body 102 may not be perfectly aligned.

As shown in FIG. 3, one technique for adapting control signals 207 to the reference frame of the control surfaces 106 could involve transforming the missile yaw (x) and pitch (y) coordinates to the control surface yaw (x') and pitch (y') coordinates as follows:

$$x'=x(\cos \phi)+y(\sin \phi)$$

$$y'=-x(\sin \phi)+y(\cos \phi)$$

Other transformations, adaptations, combinations or other manipulations may be used in any number of alternate but equivalent embodiments.

Figure 4:
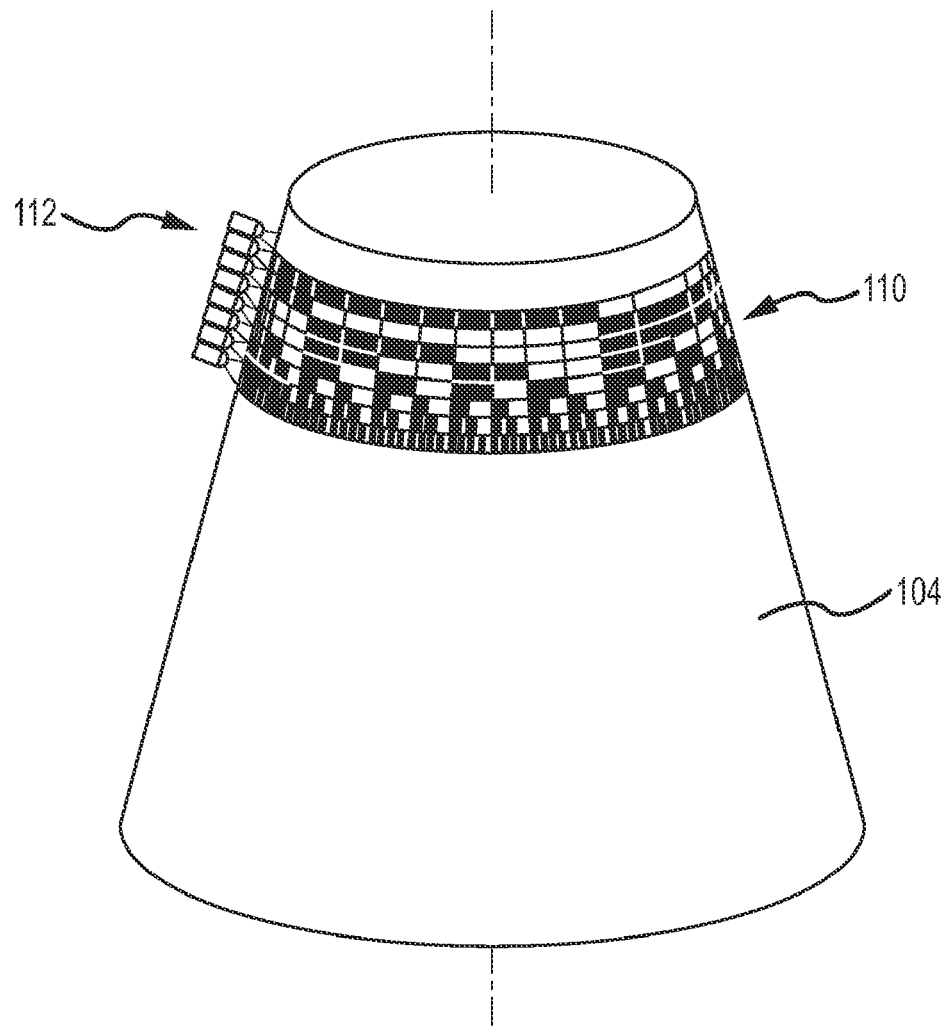
FIG. 4 is a diagram of an exemplary detecting pattern that could be used to detect roll orientation in an exemplary embodiment.

FIG. 4 shows an additional detail of an exemplary pattern 110 encircling the outer surface of exit cone 104. In this example, eight rows are shown, and detector 112 correspondingly includes eight optical detectors to determine whether each row is "shaded" or "not shaded" in the particular orientation observed. The eight rows shown in FIG. 4 would be able to indicate 256 (2^8) different positions of exit cone 104 with respect to any reference 109 on missile 100. By determining which combinations of the eight rows are "shaded" versus "non shaded" at the position closest (or most relevant to) detector 112, the angular orientation of exit cone 104 with respect to detector 112 can be measured with a relatively fine level of accuracy. Although FIG. 4 shows the test pattern 110 encircling the entire exit cone 104, pattern 110 may only be needed on a portion of the circumference of exit cone 104, depending upon the potential variation in roll orientation that could occur from joint 105. Additional resolution may be added to pattern 110 by increasing the number of rows providing data, and/or by reducing the size of the cells used in the pattern. Conversely, less resolution could be provided by increasing the size of the cells and/or using fewer rows, as desired.

According to various exemplary embodiments, then, a missile assembly is provided that allows threaded and/or other types of joints 105 between missile components 102 and 104 even though the alignment precision of such joints 105 may exhibit variations from missile-to-missile. By measuring the roll orientation of the control surfaces 106 for each particular missile 100 and adapting control signals to the control surfaces 106 based upon this measurement, reliable and accurate performance can be maintained even if misalignments between missile components do occur.

Although the exemplary embodiments described herein primarily relate to the relative roll orientation of an exit cone 104 and a missile body 102, equivalent concepts could be used to align any number of different components, control surfaces and/or the like in any number of different settings. The measurement-and-compensation techniques described herein may be useful in manned or unmanned aircraft, for example, or in other aerospace settings. Similar concepts may be applied to surface or submersible watercraft or other vehicles as well. Generally speaking, then, the concepts of joining a first component to a second component using a threaded or non-threaded joint, measuring the relative orientation of the first and second components, and then using the relative orientation to compensate during subsequent operation could be applied in any number of settings, including those described herein and many others.

As used herein, the word "exemplary" means "serving as an example, instance, or illustration". "Exemplary" embodiments are not intended as models to be literally duplicated, but rather as examples that provide instances of embodiments that may be modified or altered in any way to create other embodiments. Any implementation described herein as "exemplary" is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. Various changes may be made in the function and arrangement of elements described without departing from the scope of the invention and its legal equivalents.

What is claimed is:

1. A method to operate a control surface of a projectile, the method comprising:
   obtaining a measurement of a roll orientation of the control surface relative to the projectile as an angular position of a structure that houses the control surface with respect to a roll axis of the projectile;
   generating a compensated control command to actuate the control surface, wherein the compensated control command is determined at least in part based upon the received measurement to account for the roll orientation of the control surface relative to the projectile; and providing the compensated control command to thereby actuate the control surface during operation of the projectile.

2. The method of claim 1 wherein the obtaining comprises receiving an input from a detector that measures the roll orientation of the control surface relative to the projectile.

3. The method of claim 1 wherein the obtaining comprises determining the roll orientation of the control surface relative to the projectile by initially actuating the control surface and monitoring a reaction to the initial actuation by the projectile during flight of the projectile, and wherein the compensated control command is generated during subsequent flight of the projectile after the measurement is obtained.

4. The method of claim 1 wherein the obtaining comprises detecting an optical code on the structure that houses the control surface and that is coupled to the projectile.

5. The method of claim 1 wherein the structure is coupled to the projectile by a threaded joint.

6. The method of claim 1 wherein the projectile includes a rocket motor that is configured to produce thrust gases, said structure comprising a rocket motor exit cone that houses the control surface that is actuatable to extend into the thrust gases and thereby chance a heading of the projectile.

7. The method of claim 6 wherein the compensated control command is adjusted to compensate for the angular position of the exit cone relative to the projectile.

8. The method of claim 7 wherein the compensated control command is adjusted by performing a coordinate system transformation based upon the angular position of the exit cone relative to the projectile.

9. The method of claim wherein the obtaining, generating and providing, are performed by a digital controller located within the projectile.

10. The method of claim 1 further comprising storing the measurement of a roll orientation of the control surface relative to the projectile in a memory located within the projectile, and wherein the obtaining comprises retrieving the stored measurement from the projectile.

11. A missile comprising:
a missile body housing a rocket motor that is configured to produce thrust gases;
an exit cone coupled to the missile body and having a roll orientation relative to the missile body, wherein the exit cone comprises a control surface that is actuatable to extend into the thrust gases and thereby change a heading of the missile; and
a controller configured to obtain a measurement of the roll orientation of the exit cone as an angular position of the exit cone with res sect to a roll axis of the missile body, to generate a control command to actuate the control surface that is compensated for the measured roll orientation of the exit cone, and to provide the compensated control command to thereby actuate the control surface and thereby change the heading of the missile.

12. The missile of claim 11 wherein the missile further comprises a detector configured to measure the roll orientation of the exit cone with respect to the missile body, and wherein the controller obtains the measurement of the roll orientation of the exit cone from the detector.

13. The missile of claim 11 wherein the exit cone is coupled to the missile body by a threaded joint, and wherein the measurement is obtained after the exit cone and missile body are coupled to each other by the threaded joint.

14. The missile of claim 11 Wherein the exit cone comprises a pattern on at least a portion of its outer surface, and wherein the missile further comprises an optical reader configured to provide an indication of the pattern as the measurement of the roll orientation of the exit cone.

15. The missile of claim 11 wherein the controller is further configured to initially actuate the control surface during operation of the missile, to detect a response to the initial actuation during flight, of the missile, and to determine the roll orientation of the exit cone based upon the detected response.

16. The missile of claim 11 further comprising a memory, and wherein the controller is configured to obtain the measurement of the roll orientation from the memory.

17. A missile comprising:
a missile body housing an engine configured to produce thrust gases;
an exit cone coupled to the missile body by a threaded joint and having roll orientation relative to the missile body that is dependent at least in part upon the threaded joint, and wherein the exit cone comprises a thrust control vector mechanism with a plurality of control surfaces that are each actuatable to extend into the thrust gases and thereby change a heading of the missile;
a detector configured to provide a measurement of a roll orientation of the exit cone relative to the missile body as an angular position of the exit cone with respect to a roll axis of the missile body; and
a controller configured to receive the measurement of the roll orientation of the exit cone from the detector, to generate a plurality of control commands to actuate each of the plurality of control surfaces, wherein each of the control commands is compensated at least in part based upon the measurement of the roll orientation of the exit cone, and to provide the compensated control commands to thereby actuate the control surfaces and thereby change the heading of the missile.

18. The missile of claim 17 wherein the exit cone comprises a pattern on at least a portion of its outer surface, and wherein the detector is an optical reader configured to provide an indication of the pattern as the measurement of the roll orientation of the exit cone.

19. The missile of claim 18 wherein the optical reader measures the roll orientation by determining a portion of the pattern that is proximate the optical reader.

20. The missile of claim 17 wherein the control commands are adjusted by performing a coordinate system transformation based upon the angular position of the exit cone relative to the missile body.

21. A method to operate a control surface of a projectile, the method comprising;
obtaining a measurement of a roll orientation of the control surface relative to the projectile as an angular position of a structure that houses the control surface with respect to a roll axis of the projectile;
generating a compensated control command to actuate the control surface, wherein the compensated control command is determined at least in part based upon the received measurement to account for the roll orientation of the control surface relative to the projectile;
using a control function to produce a command signal for the control surface in response to applied commands;
compensating the command signal with the compensated control command to produce a compensated command signal; and
providing the compensated command signal to thereby actuate the control surface during operation of the projectile.

22. A method to operate control surfaces of a projectile, said projectile having a rocket motor configured to produce thrust gases and a rocket motor exit cone comprising a plurality of control surfaces that are each actuable to extend into the thrust gases and thereby change a heading of the projectile, the method comprising:

obtaining a measurement of a roll orientation of the control surfaces relative to the projectile as an angular position of the rocket motor exit cone with respect to a roll axis of the projectile;

generating a compensated control command to actuate the control surface, wherein the compensated control command is determined at least in part based upon the received measurement to account fur the roll orientation of the control surface relative to the projectile;

using a control function to produce command signals for the control surfaces in response to applied commands;

compensating the command signals with the compensated control command to produce compensated command signals that account for angular misalignment of the rocket motor exit cone to the projectile; and providing the compensated command signal to thereby actuate the control surfaces during operation of the projectile.

23. The method of claim 22 wherein the command signal is compensated by performing a coordinate system transformation based upon the angular position of the exit cone with respect to the roll axis of the projectile.

24. The method of claim 22, wherein the exit cone is threaded onto the projectile with an arbitrary roll orientation with respect to the roll axis of the projectile.

* * * * *